No. 752,057. PATENTED FEB. 16, 1904.
L. D. FRENOT.
SAFETY NUT LOCK.
APPLICATION FILED APR. 25, 1903.
NO MODEL.
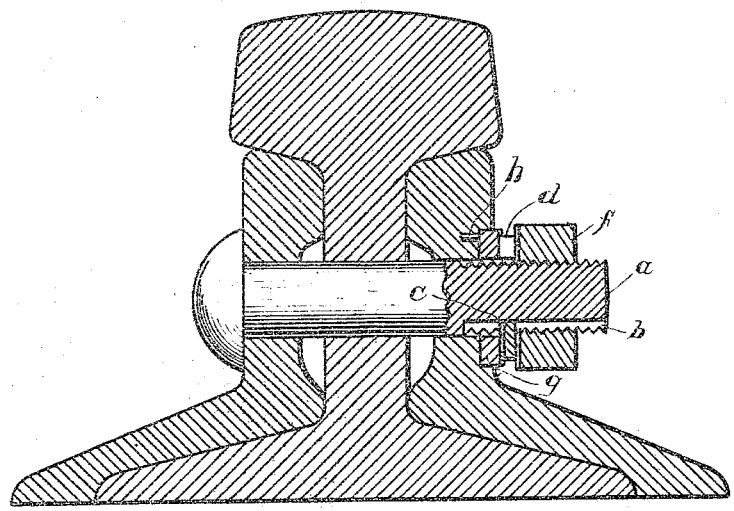
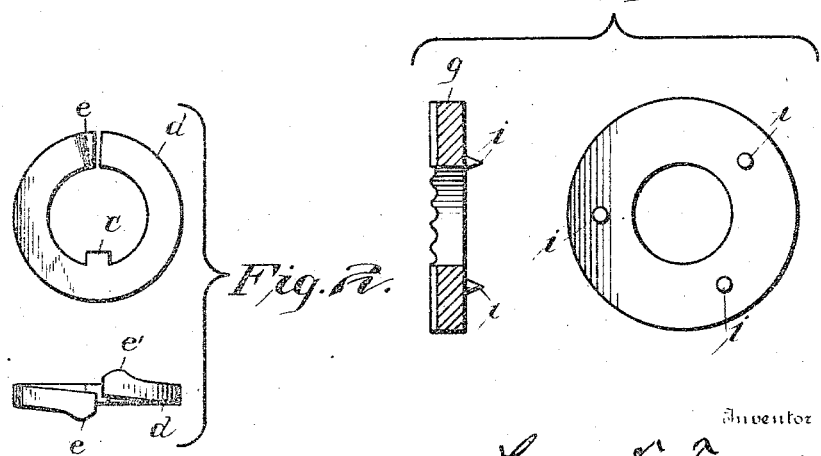

No. 752,057.

Patented February 16, 1904.

UNITED STATES PATENT OFFICE.

LOUIS D. FRENOT, OF NEWARK, NEW JERSEY.

SAFETY NUT-LOCK.

SPECIFICATION forming part of Letters Patent No. 752,057, dated February 16, 1904.

Application filed April 25, 1903. Serial No. 154,285. (No model.)

*To all whom it may concern:*

Be it known that I, LOUIS D. FRENOT, a citizen of the United States of America, residing at Newark, New Jersey, have invented certain new and useful Improvements in Safety Nut-Locks; and I do hereby declare the following to be a full, clear, and exact description of the invention, such as will enable others skilled in the art to which it appertains to make and use the same.

My invention relates to nut-locks for bolts, and more especially to that class of bolts where resilient and corrugated rings or washers are used.

In the accompanying drawings, Figure 1 is a cross-section through a rail with fish-plates, bolt, washers, and nut embodying my invention. Fig. 2 shows an elevation of a spring-ring. Fig. 3 is a front face and cross-section of a modified form of washer.

The bolt $a$ is provided with a longitudinal groove $b$, into which a tooth $c$ of the spring-ring $d$, Fig. 2, engages. This tooth is disposed diametrically opposite the opening between the meeting ends of the ring, by means of which greater resiliency in the ring is obtained. Said ring has at the meeting ends reinforcements $e$ and $e'$, adapted to engage corrugated surfaces on the nut $f$ and on a washer $g$. The resiliency in this ring is due to the fact that its ends are normally bent out of the plane of the ring itself, as seen in Fig. 2, the disposition of said ends being such that normally the adjacent faces are substantially in the same plane. Said washer is not employed in all cases. When the bolt is grooved and the spring-ring $d$ engages the groove with a tooth $c$, the ring is prevented from turning and the reinforcement $e$ at one end is sufficient to engage the corrugations on the nut $f$. The other reinforcement $e'$ in this instance may be omitted and the ring is smooth and leans against the surface of the fish-plate or other parts.

In using a corrugated washer $g$ I provide the ring $d$ with reinforcements $e$ and $e'$ at both of the meeting ends, one to coöperate with the corrugations of the nut $f$ and the other with the corrugations of the washer $g$. Said washer may be sunk in the fish-plate, as shown, and may be prevented from turning by a pin, such as $h$ in Fig. 1; but the corrugations may be stamped directly into the metal of a fish-plate or any other part of the elements to be united by the bolt and nut.

It is evident that by screwing the nut $f$ home the reinforcements $e$ and $e'$ will rest in one or the other corrugations in the opposite surfaces of the nut $f$ and the washer $g$, and any accidental or undesired loosening of the nut will be impossible. The locking of the device in this way will be even perfectly safe when the tooth $c$ is omitted and when the bolt $a$ has no groove.

In using my improved nut-lock for wooden structures I provide the washer $g$ with pointed pins $i$, Fig. 3, instead of the pin $h$, Fig. 1. These pointed pins sink in the wood when the nut is screwed up tight and prevent the washer $g$ from turning. Thus the nut is locked by the spring-ring, Fig. 2, in the manner above described.

Having thus described my invention, I claim as new—

The combination with a bolt having longitudinal groove, and a fish-plate, a washer seated in a recess in the outer face of said fish-plate and provided with a pin engaging an opening in the fish-plate, the outer face of said washer being corrugated, a nut on said bolt having its inner face corrugated and a split ring surrounding the bolt and interposed between the nut and washer, said ring being provided with an inwardly-extending tooth diametrically opposite the opening therein and engaging the groove in the bolt, the meeting ends of said ring being normally bent out of the plane of the ring itself and provided with oppositely-disposed enlargements adapted to engage the corrugations of the nut and washer, all substantially as and for the purpose specified.

In testimony whereof I affix my signature.

LOUIS D. FRENOT.

In presence of—
 FREDK. C. FRAENTZEL,
 HARRY W. EVANS.